US008757827B2

(12) United States Patent
Hunt

(10) Patent No.: US 8,757,827 B2
(45) **Date of Patent: *Jun. 24, 2014**

(54) FILE SYSTEM FOR A STAGE LIGHTING ARRAY SYSTEM

(75) Inventor: Mark A. Hunt, Derby (GB)

(73) Assignee: Production Resource Group, LLC, New Windsor, NY (US)

( * ) Notice: Subject to any disclaimer, the term of this patent is extended or adjusted under 35 U.S.C. 154(b) by 155 days.

This patent is subject to a terminal disclaimer.

(21) Appl. No.: 13/545,241

(22) Filed: Jul. 10, 2012

(65) Prior Publication Data

US 2012/0284565 A1 Nov. 8, 2012

Related U.S. Application Data

(63) Continuation of application No. 13/018,218, filed on Jan. 31, 2011, now Pat. No. 8,219,933, which is a continuation of application No. 11/861,182, filed on Sep. 25, 2007, now Pat. No. 7,878,671, which is a continuation of application No. 10/913,022, filed on Aug. 6, 2004, now Pat. No. 7,290,895.

(60) Provisional application No. 60/493,862, filed on Aug. 8, 2003.

(51) Int. Cl.

| | |
|---|---|
| ***F21V 33/00*** | (2006.01) |
| ***H05B 37/00*** | (2006.01) |
| ***H05B 39/00*** | (2006.01) |
| ***G09G 5/00*** | (2006.01) |
| ***G06F 11/00*** | (2006.01) |
| ***G06F 15/177*** | (2006.01) |
| ***G06F 3/00*** | (2006.01) |

(52) U.S. Cl.
USPC ................ 362/85; 315/312; 345/1.3; 714/57; 715/735; 715/740

(58) Field of Classification Search
USPC ............. 700/3, 17, 19; 714/57; 715/205, 726, 715/735, 740, 760, 838; 725/37; 315/312, 315/316, 318; 345/1.3, 440, 619; 362/85, 362/233
See application file for complete search history.

(56) References Cited

U.S. PATENT DOCUMENTS

| | | | |
|---|---|---|---|
| 5,061,997 | A | 10/1991 | Rea et al. |
| 5,769,527 | A | 6/1998 | Taylor et al. |
| 5,812,422 | A | 9/1998 | Lyons |
| 5,940,049 | A | 8/1999 | Hinman et al. |
| 5,969,485 | A | 10/1999 | Hunt |
| 5,983,280 | A | 11/1999 | Hunt |
| 6,029,122 | A | 2/2000 | Hunt |
| 6,175,771 | B1 | 1/2001 | Hunt et al. |

(Continued)

FOREIGN PATENT DOCUMENTS

| | | | |
|---|---|---|---|
| JP | 2003068473 | A | 3/2003 |

*Primary Examiner* — Crystal J Barnes-Bullock
(74) *Attorney, Agent, or Firm* — Law Office of Scott C. Harris, Inc.

(57) ABSTRACT

A file system for a stage lighting system that maintains the different files associated with the stage lighting system. Each of the files that can represent an effect are maintained within the system within a configuration file. The configuration file can be updated on each start of the system so that the system can maintain information indicative of current configuration files. A test mode can also be entered in which a pre-formed show can be tested against the current state of the configuration files.

22 Claims, 3 Drawing Sheets

(56) References Cited

U.S. PATENT DOCUMENTS

| | | | |
|---|---|---|---|
| 6,369,835 | B1 | 4/2002 | Lin |
| 6,429,867 | B1 | 8/2002 | Deering |
| 6,538,797 | B1 | 3/2003 | Hunt |
| 6,548,967 | B1 | 4/2003 | Dowling et al. |
| 6,549,326 | B2 | 4/2003 | Hunt et al. |
| 6,597,132 | B2 | 7/2003 | Hunt et al. |
| 6,674,955 | B2 | 1/2004 | Matsui et al. |
| 6,765,544 | B1 | 7/2004 | Wynne |
| 6,774,584 | B2 | 8/2004 | Lys et al. |
| 6,801,353 | B2 | 10/2004 | Hunt et al. |
| 6,891,656 | B2 | 5/2005 | Hunt |
| 6,894,443 | B2 | 5/2005 | Hunt et al. |
| 6,922,679 | B2 | 7/2005 | Walkins |
| 6,961,922 | B1 | 11/2005 | Knutson |
| 7,020,390 | B2 | 3/2006 | Maeda et al. |
| 7,057,797 | B2 | 6/2006 | Hunt |
| 7,139,617 | B1 | 11/2006 | Morgan et al. |
| 7,148,632 | B2 | 12/2006 | Berman et al. |
| 7,161,562 | B1 | 1/2007 | Hunt |
| 7,181,112 | B2 | 2/2007 | Harris |
| 7,185,274 | B1 | 2/2007 | Rubin et al. |
| 7,194,701 | B2 | 3/2007 | Stavely et al. |
| 7,199,805 | B1 | 4/2007 | Langmacher et al. |
| 7,301,662 | B2 | 11/2007 | Mifune |
| 7,355,637 | B2 | 4/2008 | Ucino |
| 7,369,262 | B2 | 5/2008 | Masumoto et al. |
| 7,693,368 | B2 | 4/2010 | Harris |
| 7,764,026 | B2 | 7/2010 | Dowlling et al. |
| 2002/0078221 | A1 | 6/2002 | Blackwell et al. |
| 2002/0181070 | A1 | 12/2002 | Hewlett |
| 2003/0076322 | A1 | 4/2003 | Ouzts et al. |
| 2004/0160198 | A1 | 8/2004 | Hewlett et al. |
| 2004/0252486 | A1 | 12/2004 | Krause |
| 2005/0057543 | A1 | 3/2005 | Hunt et al. |
| 2005/0083487 | A1 | 4/2005 | Hunt et al. |
| 2005/0094635 | A1 | 5/2005 | Hunt |
| 2005/0108643 | A1 | 5/2005 | Schybergson et al. |
| 2005/0190985 | A1 | 9/2005 | Hunt |
| 2005/0200318 | A1 | 9/2005 | Hunt et al. |
| 2005/0206328 | A1 | 9/2005 | Hunt |
| 2005/0207163 | A1 | 9/2005 | Hunt |
| 2005/0213335 | A1 | 9/2005 | Hunt |
| 2005/0275626 | A1 | 12/2005 | Mueller et al. |
| 2006/0064716 | A1 | 3/2006 | Sull et al. |
| 2006/0187532 | A1 | 8/2006 | Hewlett et al. |
| 2006/0227297 | A1 | 10/2006 | Hunt |
| 2007/0183152 | A1 | 8/2007 | Hauck et al. |
| 2010/0188019 | A1 | 7/2010 | Harris |
| 2011/0115413 | A1 | 5/2011 | Erickson et al. |
| 2013/0294050 | A1* | 11/2013 | Lee et al. ........................ 362/86 |

* cited by examiner

FILE SYSTEM FOR A STAGE LIGHTING ARRAY SYSTEM

CROSS-REFERENCE TO RELATED APPLICATION

This application is a continuation application of and claims priority to U.S. patent application Ser. No. 13/018,218 filed Jan. 31, 2011, now U.S. Pat. No. 8,219,933 issued Jul. 10, 2012, which is a continuation of U.S. application Ser. No. 11/861,182 filed Sep. 25, 2007, now U.S. Pat. No. 7,878,671 issued Feb. 1, 2011, which is a continuation application of U.S. patent application Ser. No. 10/913,022, filed Aug. 6, 2004, now U.S. Pat. No. 7,290,895 issued Nov. 6, 2007, which claims benefit of the priority of U.S. Provisional Application Ser. No. 60/493,862, filed Aug. 8, 2003, and entitled “File System for a Stage Lighting Array System,” the disclosure of which is herewith incorporated by reference in their entirety.

BACKGROUND

Stage lighting systems may be extremely complex. A typical system may include a console which controls a number of different lighting systems. Each lighting system may be a self-contained system, or may be a computer-based box that controls an external system. Many complicated effects are often carried out during the show. The complicated effects require knowledge of the files that actually exist within each lamp.

SUMMARY

The present system defines a special file system and discovery mechanism for automatically determining the content of certain files in a display system of a type adapted for digital control of an external projector.

DETAILED DESCRIPTION

Figure 1:
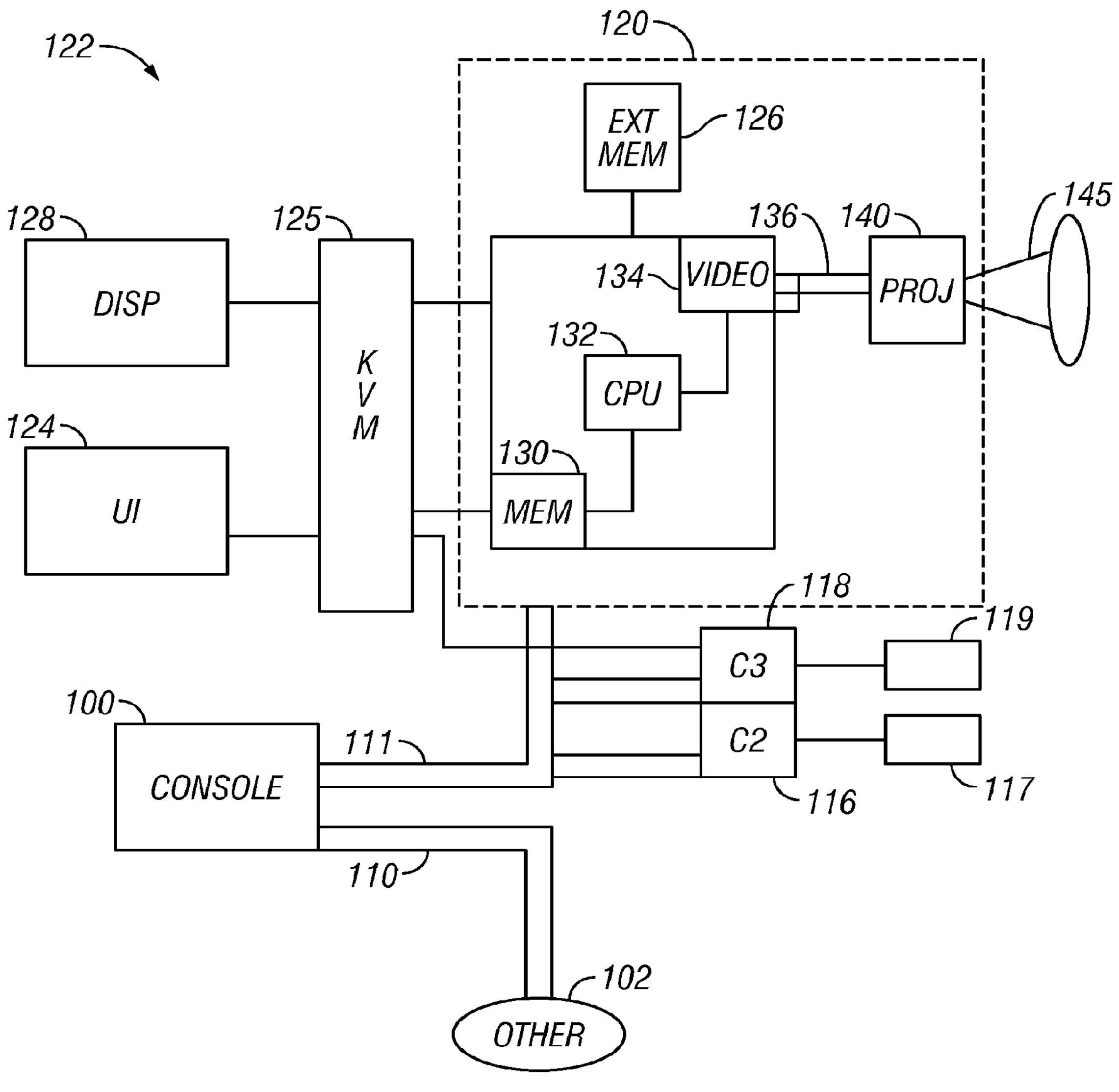
FIG. 1 shows a block diagram of the overall system.

A block diagram of the basic system is shown in FIG. 1. A number of lights collectively form a “show”, with the number of lights typically being between 5 and 200 lights, although there is no actual limit on the number of lights that can form a show. Effects being produced by all of these lights are controlled by the console 100, under control of a lighting designer or operator. The console may produce one or many outputs which collectively control the array of lights. In FIG. 1, the line 111 is shown connected from console 100, to control a first light assembly 120 which is explained in further detail. The line 110 is shown as controlling other lights shown generically as 102; where it should be understood that there are at least 2 lights, and more typically between 5 and 200 lights in the overall show. In an embodiment, the controlling line 110 may be a control using ethernet protocol.

The actual light 120 being controlled by the control line 102 is an M BOX™ light made by Light and Sound Design, Ltd. The M BOX is formed of a computer part 122 which is programmed with suitable programs as described herein, a user interface 124, an external memory source 126, and a display 128. In a preferred embodiment, a keyboard switch or KVM switch 125 is used so that the user interface 124 and display 128 may be used in common for all of a multiplicity of different computer units 122,116 & 118.

The computer part 122 also includes its own internal memory 130, which stores both programs which are used for image processing, and also stores prestored gobos and effects to be used by the light. For example, the memory 130 may store video clips, as well as a number of different shapes, and may store specified libraries from different gobo manufacturers. The gobo shapes may be used to shape the outer shape of the light beam being projected. In an embodiment, the final effect produced by the light may be a combination of a number of different layers, and the shape of the layer may also be controlled by the images stored in memory 130.

The computer part 122 also includes a processor shown as CPU 132, and a video card 134. All of these may be off-the-shelf items. The CPU 132 operates based on the programs stored in memory 130 to produce a video output using video card 134. The video output 136 is connected to an external projector 140. In an embodiment, this projector 140 may be a projector which is digitally controllable, which is to say that each of a plurality of digital bits forming the image is separately controllable for brightness, color and other aspects such as duty cycle. For example, the projector 140 may be a digital micromirror based device or DMD, also referred to as a digital light processor based device. The projector produces an output effect 145 which is used for part of the show. For example, the effect 145 may be projected onto the stage.

As explained above, there be may be a number of computer units 122 controlled by the common user interface 124 and display 128, and also controlled by the ethernet control signal 102. In this embodiment, two additional computer units 116 and 118 are shown, each also controlling external projectors 117, 119 to produce other lighting effects.

In operation, the CPU 132 operates according to a stored program to carry out certain operations based on the basic shapes and effects which are stored in the memory 130. For example, the CPU 132 typically controls a number of different layers collectively forming the image which is used to control the projector. Each of these layers may define shape, color and movement. The movements can be rotations or can be more complicated movements. One layer may cover any other layer or may add to or subtract from any of the other layers. The combined images, as controlled in this way, form a composite image 136 which is used to control the projector.

Figure 2:
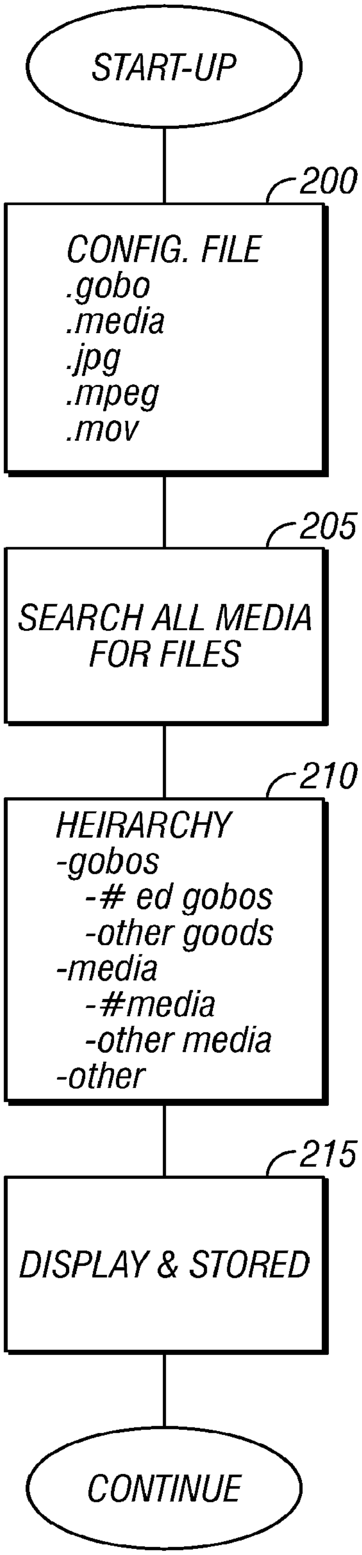
FIG. 2 shows a flowchart of operation of the stored a routine which automatically indexes the kinds of files which can be used.

The images may be stored in memory as libraries, or may be part of external memory 126 that is added to the libraries. The CPU 132, however, needs to know which images it can use. Accordingly, the CPU executes the routine shown in FIG. 2 at startup. This routine enables the system to look for all of the different files and effects which can be used during the operation.

At 200, the device looks for its configuration file. The configuration file defines which kinds of files to look for in the system. Typical files may be files of type “gobo”, type “media”, as well as more conventional types such as JPEG and MPEG files may be used. In addition, the user can specify different types of files. The type of gobo in the type “media” are special files for use with the M BOX system. The “gobo” file comprises compiled code representing an effect of a gobo, which may comprise an image which is compiled to include a certain effect.

At 205, the processor searches all the memory media which may include memory 130, as well as external memory 126, for all files of the specified types. This search may use an indexing technique for faster results. For example, the indexing technique may index all files on the memory 130 during spare time of the computer 122. Any file which is added after the index, of course, needs to be searched separately and otherwise the system simply searches the index. A similar indexing technique may be used for external memory 126 by using a serial number of the external memory; that is, by using a unique identifying code referring to the removable memory. The external memory may be a removable memory such as a memory stick or like nonvolatile memory, or a CD or DVD drive.

At 210, the CPU makes a list of all the found files, and arranges them in a specified hierarchy. In one preferred hierarchy, a hyperlinked list, for example, in XML, is formed. The list may show the basic overall categories such as gobos, media, and others. Clicking on any item on the list may produce a sublist. Under the gobos, there is a sublist for numbered gobos, and other gobos. The basic gobos in the library may be named according to a 16-bit gobo number which uniquely identifies the gobo as part of the library. However, gobos may also be named as different things, hence the external gobos may be other gobos. Similarly, media may be numbered in a similar way, and numbered media and other media may be separately identified. Clicking on any item, such as the numbered gobos, can bring up the list of gobos or may bring up a sublist of the different gobos.

The file names associated with the gobos may also include MetaTag information, and that MetaTag information may be viewable as part of the XML hierarchy. In addition, the hierarchy shown in 210 may optionally include thumbnails or may include the light showing certain information about the gobos in the media. For example, for gobos, the thumbnail may show the basic shape of the gobo. The thumbnails may be automatically produced as a preview, or may be entered by a user as part of the meta tag information. The other information, which is shown as part of the hierarchy, may be any other feature which can be used to effect the output video produced at 134. For example, different effects which can be added to gobos can be compiled and stored as a file. The different effects may be specified types of rotation, shaping, and other such effects.

Basically any effect which can be used on an image can be compiled as one of the other effects.

The Meta Tag information and/or thumbnail information can include some information about the different gobos which are used. This hierarchy of files is displayed to the user at 215, and may be also stored in a specified location so that the user can call up the XML file at any point. In this way, a user can find the different files which exist on the system.

Figure 3:
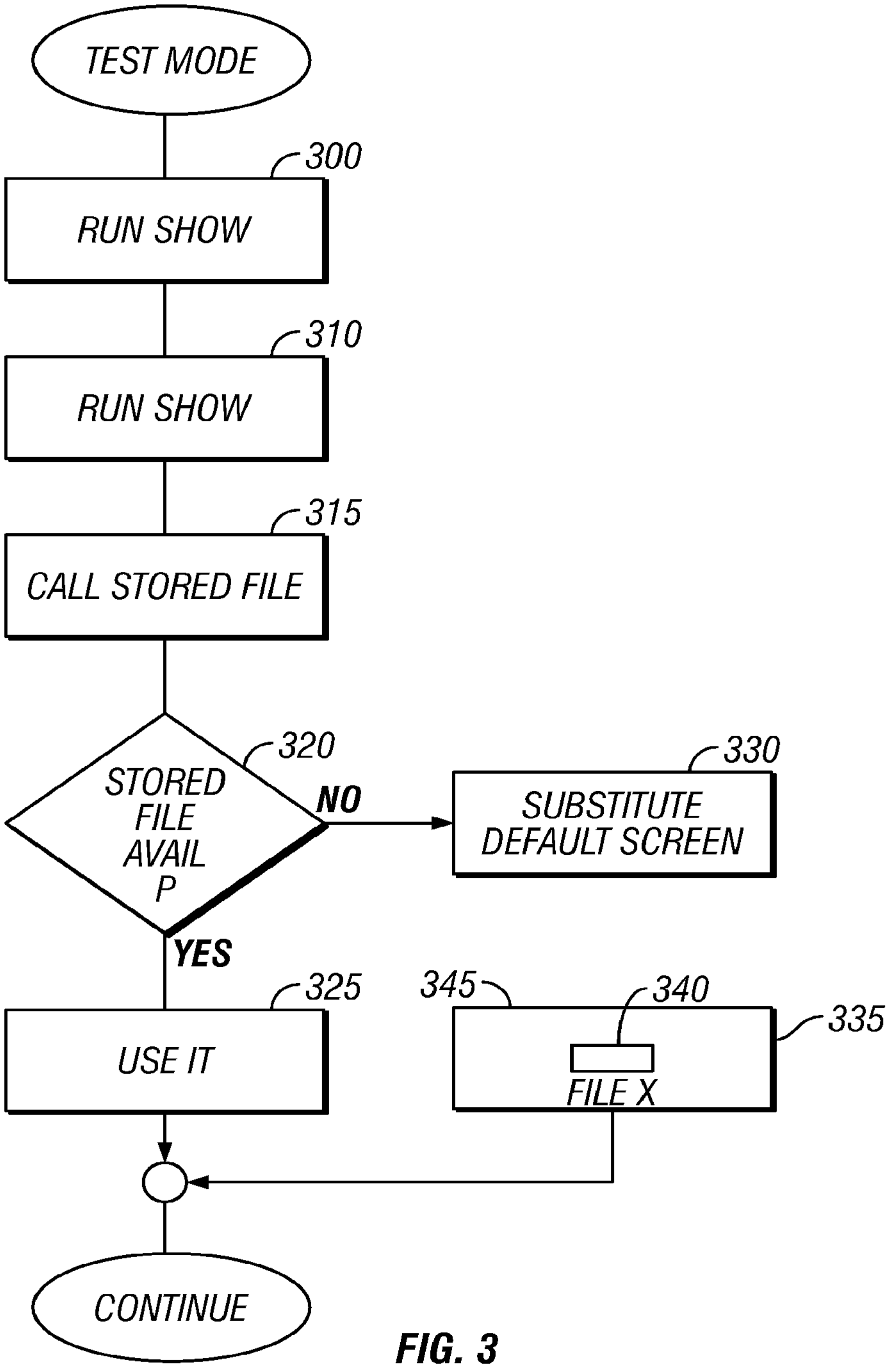
FIG. 3 shows a flowchart of operation of a special test mode.

In operation, the user/operator can select any of the files for part of the show. In addition, a show can be tested to determine if all the files needed for that show are available. The testing is carried out by entering a test mode which is shown in FIG. 3. In this test mode, the user commands that a show be run at 300. The processor begins running the show at 310 by calling up all necessary stored files and producing the layers representing those stored files with an output. The operation involves calling a stored file at 315. At 320, the system determines if the stored file is available. This may be done by searching the XML file for an index or by searching all files in the system. If the stored file is available, then the stored file is used and operation continues at 325. However, if the stored file is not available at 320, then a special default screen is substituted at 330. In an embodiment, the special default screen is as shown in 335; that is a black bar 340 shown on a white screen 345. A black bar preferably goes across approximately 70% of the screen both in width and in height directions. This default screen makes it very easy to determine which files are unavailable.

In an embodiment, the file name may also be alphanumerically placed on the default screen. The operation then continues to show the remainder of the show with the default screen in place of the missing file. A user reviewing this, however, may be able to determine, at a glance, that the default screen is present and therefore that a file is missing.

Although only a few embodiments have been disclosed in detail above, other modifications are possible. For example, other types of default screens may be used. In addition, other files besides those mentioned may be used, and also this system may be usable in other types of lighting instruments. For example, this system has been described as being used in a system in which the computer box which controls the image that is formed is separate from the projector that actually projects the image. However, the computer box 122 and projector 140 may be combined into a single device, such as the icon M device. In addition, while the above describes the projector as being a DMD based projector, other types of controlled projectors may also be used, including projectors based on grating light valves and the like.

All such modifications are intended to be encompassed within the following claims, in which:

What is claimed is:

1. A light controlling computer, comprising:

a memory, storing a plurality of lighting effects, wherein each lighting effect includes at least one stored file representing operations to be carried out on at least one controlled light that is being controlled by said light controlling computer;

a processor, operating to control said at least one controlled light according to a program including at least a first subset of said plurality of lighting effects; and said processor programmed for testing the control by executing each of the first subset of the lighting effects, said testing comprising attempting to retrieve first stored files corresponding to said first subset of the lighting effects from said memory, and producing an error indication if any of the first stored files are not present; and said processor producing outputs indicative of the program to control said at least one controlling light, during a control operation.

2. The computer as in claim 1, wherein said processor produces outputs displaying information indicative of the first stored files if present.

3. The computer as in claim 1, wherein said processor produces said error indication comprises a screen showing lighting effects that are present, and a bar shown across the screen in place of a lighting effect that is not present.

4. The computer as in claim 1, wherein said processor produces said error indication comprises a screen showing lighting effects that are present, and a name of a file which is missing.

5. The computer as in claim 1, wherein said processor produces an output that shows an effect, said output being in a form to be displayed.

6. The computer as in claim 5, wherein said computer includes a connection to a plurality of different computers, each of said different computers connectable to test the show within stored files within the light controlling computer.

7. The computer as in claim 1, wherein said processor testing the control by searching all files that are stored on a local computer system for files within the first stored files.

8. The computer as in claim 1, wherein said processor maintains an index of files of lighting effects, wherein said processor testing the control by searching all files that are stored on a local computer system for files within the index of files.

9. A lighting control apparatus, comprising:

a computer system, having memory, storing a plurality of files, said files adapted for controlling a lighting device that outputs light based on electronic commands, at least a plurality of said files represent a light effects, where said light effects include shapes to be used as part of creating a light display;

said memory storing a configuration file which indicates multiple different file types that form said light effect; and a processor that runs a program that automatically searches for said multiple different file types indicated by configuration file among files within said computer system, wherein said searching occurs at a startup of the computer system, and said processor also storing a program that uses at least some of said plurality of files to command and create said light display.

10. The lighting control apparatus as in claim 9, wherein at least some of said files define said shapes that are representative of an outer perimeter of the light that is shown on said light display.

11. The lighting control apparatus as in claim 9, wherein one of said different file types includes at least a compiled code which includes an image combined with an effect for the image.

12. The lighting control apparatus as in claim 9, wherein said program that searches comprises searching both memory that is internal to said computer, as well as memory that is external to the computer.

13. The lighting control apparatus as in claim 9, wherein said multiple different file types indicated by configuration file include media files indicative of animations, and still image files.

14. The lighting control apparatus as in claim 13, wherein said multiple different file types indicated by configuration file further include a special kind of file that includes a still image file that is compiled with at least one effect for the still image file.

15. The lighting control apparatus as in claim 9, wherein said multiple different file types indicated by configuration file includes files representing gobos that include still image files.

16. The lighting control apparatus a.s in claim 9, wherein said processor indexes all files in the system at a first time to form an index, and searches the index at a second time subsequent to said first time, as said automatically searches.

17. A lighting control apparatus, comprising:

a computer having a memory storing a plurality of files that are used to create light effects on an externally, controlled light, where at least some of said files include shapes to be used as part of projecting said light;

said memory storing which indicates file types that form said effects; and said computer having a processor automatically searching for said file types indicated by configuration file among files within said memory, detecting that a light effect file has been used to form said effect is no longer available, and displaying a light effect that includes a default shape in place of said file that is no longer available.

18. An apparatus as in claim 17, further comprising at least one external memory, and wherein said processor searches files both in said memory and in said external memory.

19. An apparatus as in claim 17, wherein said configuration file includes information indicative of searching for at least media files indicative of animation and still files indicative of images.

20. An apparatus as in claim 17, wherein said configuration file includes information indicative of special gobo files that represent compiled gobo effects including both outer light shapes, and movement of the outer light shapes.

21. An apparatus as in claim 17, wherein said processor forms an index of said files, and searches said index.

22. An apparatus as in claim 21, wherein said processor also searches for files that have been added after the index was created.

* * * * *